March 9, 1965 P. G. LA HAYE 3,172,595
POWER DEVICE OPERATED BY GAS GENERATORS
Filed July 17, 1963 4 Sheets-Sheet 1

Paul G. La Haye
Inventor

Shlesinger, Shlesinger &
Arkwright
Attorneys

March 9, 1965 P. G. LA HAYE 3,172,595
POWER DEVICE OPERATED BY GAS GENERATORS
Filed July 17, 1963 4 Sheets-Sheet 4

Paul G. La Haye
INVENTOR

Shlesinger Shlesinger &
Arkwright Attorneys

– – –

United States Patent Office 3,172,595
Patented Mar. 9, 1965

3,172,595
POWER DEVICE OPERATED BY GAS GENERATORS
Paul G. La Haye, Schenectady, N.Y., assignor to Mechanical Technology Incorporated, Latham, N.Y., a corporation of New York
Filed July 17, 1963, Ser. No. 295,753
16 Claims. (Cl. 230—45)

This invention relates to turbine operated, power devices that receive their operating energy from one or more gas generators, where the gas from the generators to the turbines passes through a common plenum chamber. A plurality of individual gas generators deliver high velocity and high pressure gases into such common plenum chamber, and one or more load driving gas turbines receive their operating gas from such plenum chamber.

An object of the invention is to provide such a power device which will have maximum efficiency of operation under varying operating conditions and as the number of gas generators delivering gas to the plenum chamber varies, with which turbulence of operating gases in the plenum chamber will be substantially avoided under different operating conditions, and which is relatively safe, simple, compact, practical and inexpensive in construction and uniformly efficient in operation with variations in the number of gas generators in use.

Another object is to provide a relatively simple, safe, inexpensive, practical and efficient device for repressurizing gas in transport in a transmission line, and for pressuring to a relatively high pressure the gas that is separated from petroleum for return to the wells under pressure to force more petroleum to the surface.

A further object is to provide a power device operated by any of a plurality of gas generators, in which one unit of the power device may be used as a back up unit for any one of the operating gas generators, which employs an axisymmetric station configuration to minimize the ill effects of distortion caused by thermal expansion, which reduces the aerodynamic losses which are inherent to multiple gas generators on a common plenum chamber with multiple load turbines, which employs a plenum chamber that permits essentially maintaining the gas velocity head from the discharge of the gas generators to the inlet nozzles of the load turbine, which permits the easy access to and exchange of gas generators while the plant is in operation without adversely affecting the operation in any way, with which the gas generators may be modulated in parallel by station demand with a manual maximum load setting on each of the gas generators, and which is stable throughout the operating speed range.

Another object is to provide a power device with an improved plenum chamber for use between gas generators and a turbine drive, which will materially increase the efficiency of the device.

Other objects and advantages will appear from the following description of two examples of the invention, and the novel features will be particularly pointed out in the appended claims.

In accordance with this invention, a plurality of gas generators discharge high velocity gases into an annular, cylindrical plenum chamber adjacent one axial end of that chamber, and in similar directions tangentially of that chamber to cause the gases to swirl around that chamber. The swirling gases are removed in similar tangential directions from the plenum chamber adjacent its other axial end and employed to operate one or more drive turbines that operate loads such as to pressurize gas in transit in a transportation line, or for return to petroleum wells to force more petroleum to the surface, or to operate a compressor or electric generator, or other utilization devices.

Figure 1:
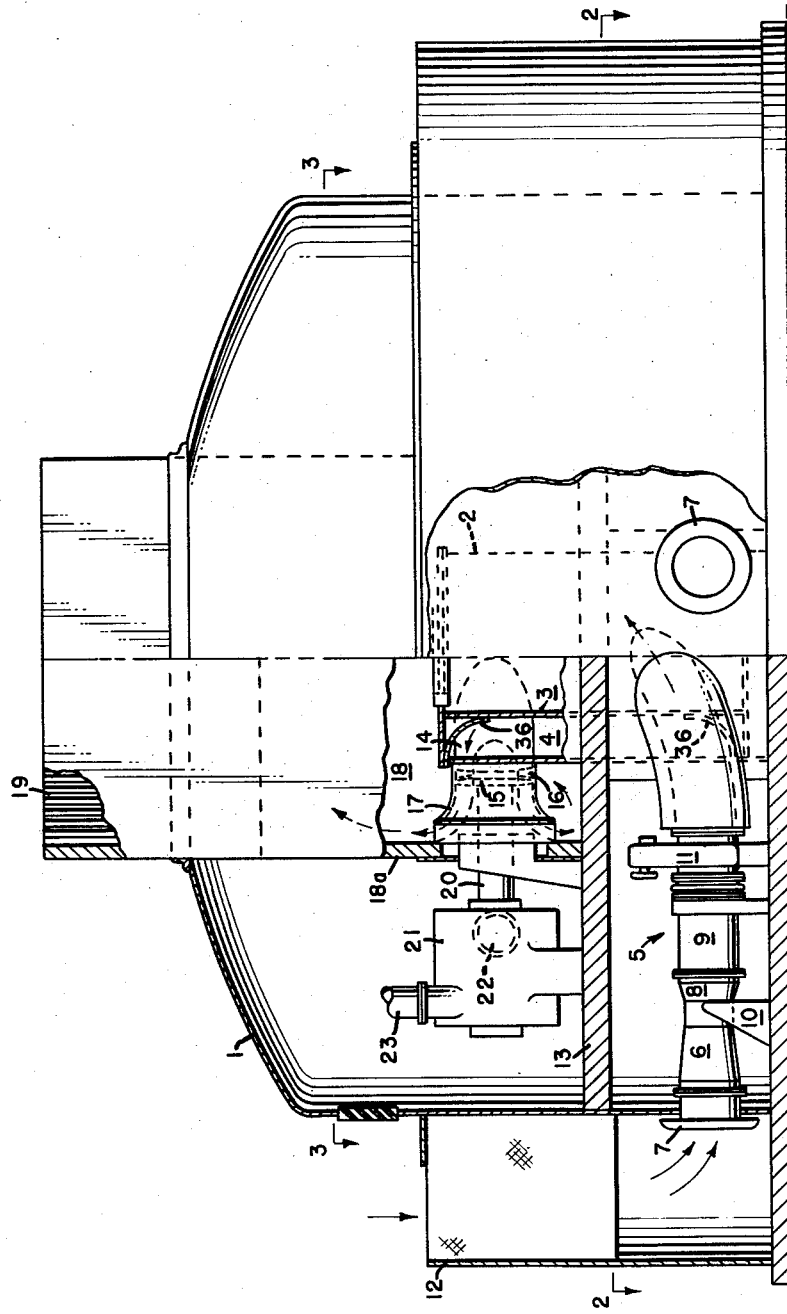
FIG. 1 is a sectional elevation of a portion of a device illustrating use of the invention for pressurizing gas, the section being taken approximately along the line 1—1 of FIG. 2 and looking in the direction of the arrows.
Figure 2:
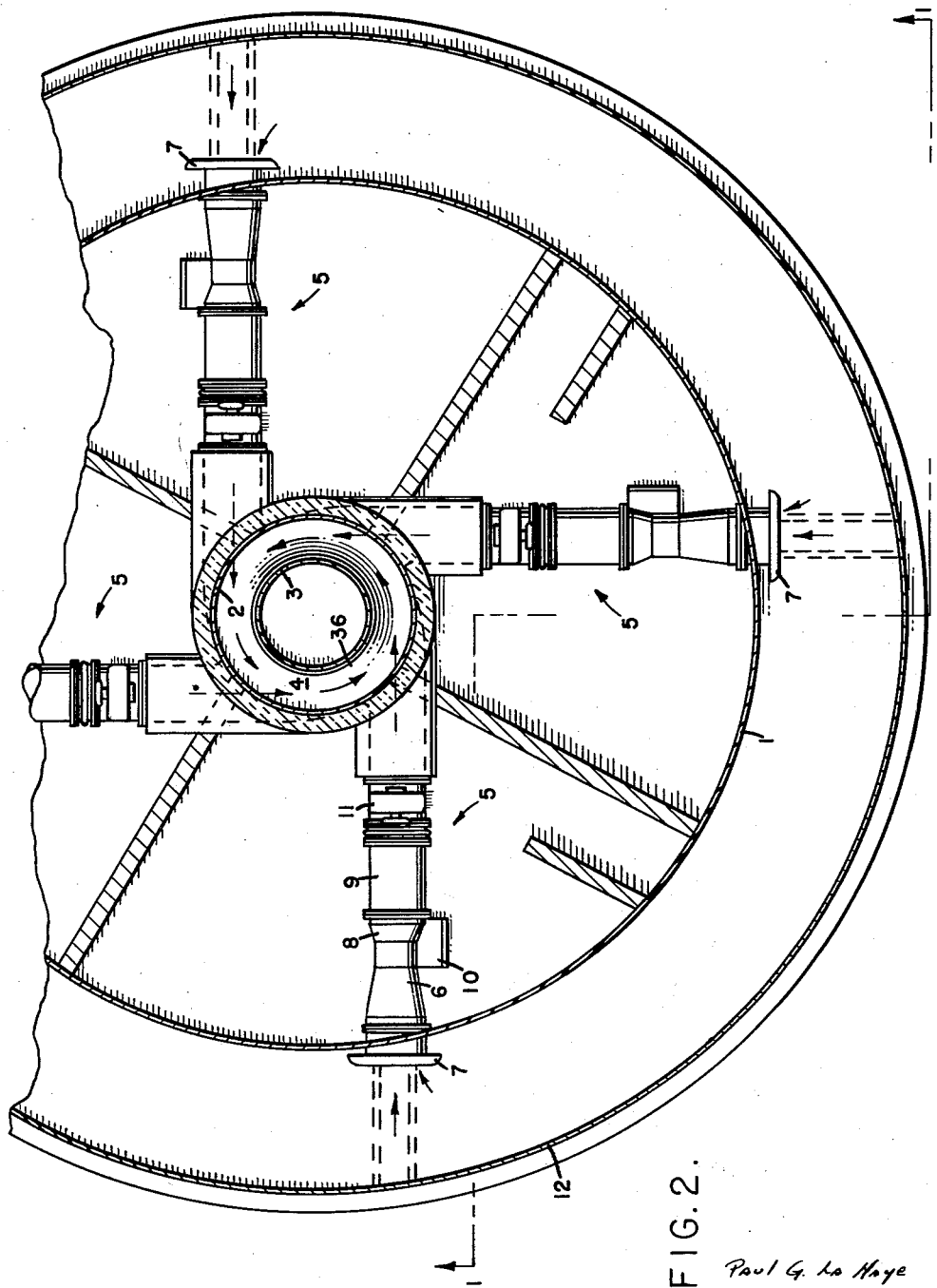
FIG. 2 is a sectional plan of the same, the section being taken approximately along the line 2—2 of FIG. 1 to illustrate the arrangement of a plurality of gas generators around the swirl chamber.
Figure 3:
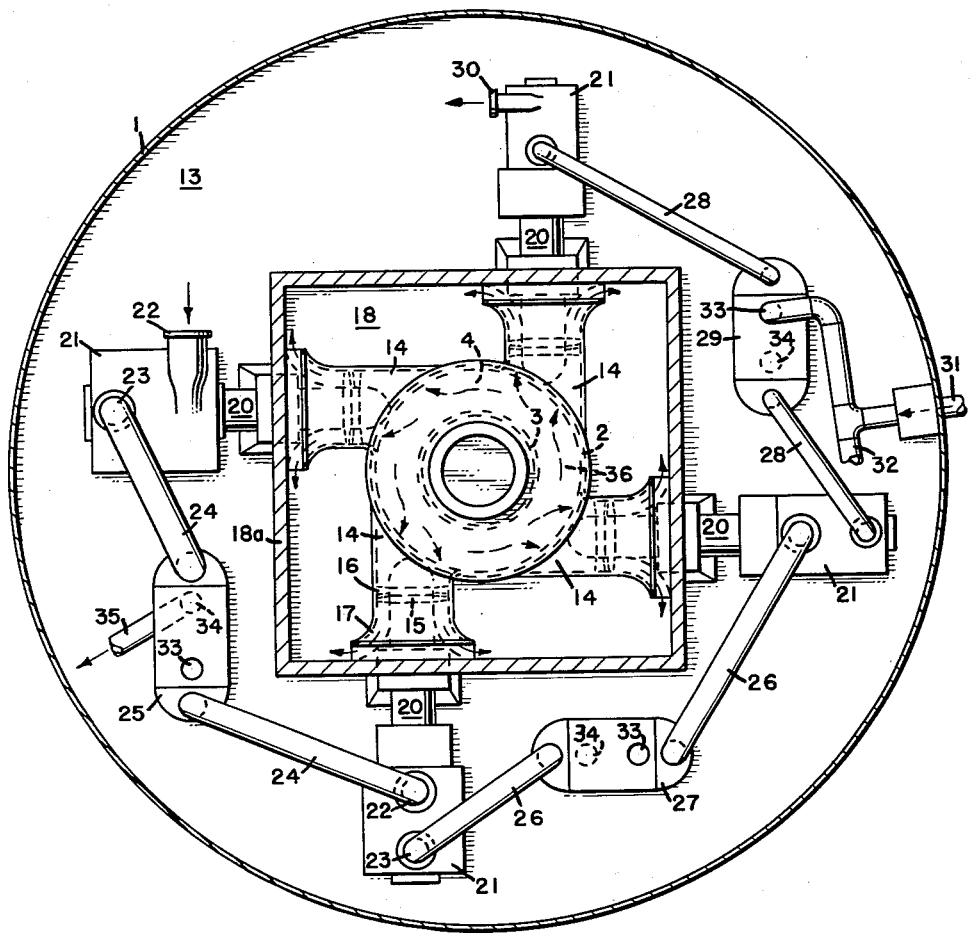
FIG. 3 is another sectional plan of the same at a higher level to show the arrangement of the load devices around the plenum chamber, the section being taken approximately along the line 3—3 of FIG. 1.

In the embodiment of the invention illustrated in FIGS. 1–3 and referring first to FIG. 2, in the center of the building 1 is an upright, cylindrical, closed housing 2 having concentrically within it a smaller cylindrical wall 3 that extends from end to end of the housing 2. The wall 3 and the cylindrical housing 2 between form an annular, cylindrical swirl chamber 4. Arranged at intervals around the lower part of the housing 2 are a plurality of individual gas generators 5, which extend from outside of the side wall of the building 1 towards the housing 2 and open into the swirl chamber 4 in similar directions approximately tangentially of the swirl chamber. These gas generators 5 are well known in the art, are similar to jet aircraft engines, and hence are shown only schematically.

One example of such a gas generator is a Pratt & Whitney Co. J–75 gas generator. It includes an air compressor 6 having an air inlet 7 at its outer end, and the compressor opens at its inner end to a combustion system 8 where it meets and is mixed with fuel and ignited. The combustion gases pass through and drive a turbine 9 which is drivingly connected to the air compressor 6.

A fuel metering and regulating system 10 is provided for the combustion system 8. The turbine 9 uses only a part of the energy of the combustion gases, and hence these gases under high pressure and at a high velocity pass through a shut-off valve 11 and then enter the swirl chamber in a direction generally tangentially thereof, but with a slight progression toward the opposite end of the swirl chamber 4, as shown in FIG. 1. The shut-off valve 11 may be operated either manually, or automatically in response to some operating condition, but since such automatic details are common in gas generators they are not further disclosed here.

In the illustrated example there are four of such gas generators, and one or more of them may be held idle for reserve or all may be used. Surrounding the lower part of the building and the inlets 7 of the gas generators is an enclosure 12 surrounding the lower part of the building 1, which functions as an air inlet for the gas generators and has baffles and silencers for the air to insure quietness of operation, the air entering the enclosure 12 in a downward direction as shown by the arrows and in passing through the arrangement of baffles is silenced. Any suitable air silencing means may be employed in the enclosure 12.

A wall 13 (FIG. 1) is disposed horizontally across the building 1 above the series of gas generators, with the housing 2 passing closely through it. Above this wall 13, the housing 2 has arranged at uniformly spaced intervals peripherally spaced about it, a plurality of outlets 14 opening outwardly in directions that are generally tangentially of the chamber 4 of the swirl chamber. In the example illustrated there are four gas generators 5 and there are also four outlets 14, but the number of each may be varied as desired and only one outlet 14 may be used even when a plurality of gas generators are employed. Disposed across each outlet 14 is a drive turbine wheel 15 and the usual nozzles 16 are provided in the outlet 14 to direct the outgoing gases as high velocity streams against the impeller vanes of the turbine wheel 15. This is the typical or any suitable turbine wheel and nozzles used therewith and hence have only been schematically illustrated. The ducts 17 leading from the turbine wheel 15, all discharge into an exhaust chamber 18, defined by an upright wall 18a, which discharges upwardly through an exhaust silencer 19.

Each turbine wheel 15 is fixed on a shaft 20 which extends horizontally to a side of the housing 2, and is drivingly connected to an individual load compressor 21 which has an inlet port 22 and an outlet port 23 that are supported on the base wall 13 and within the upright enclosure 1. These load compressors 21 are arranged at intervals around the housing 2 and connected together in a series between them to provide multiple stage compression as shown in FIG. 3.

Referring next to FIG. 3, the gas to be pressurized is admitted to the inlet port 22 of the first stage compresser 21 and passed on from the outlet 23 of that compressor to a conduit 24 which conveys the compressed gas to the inlet port 22 of the next compressor 21 in the series. A cooler 25 is included in the conduit 24 so as to cool the compressed gas before it reaches the next stage of compression. Similarly the outlet of the stage 2 compressor is connected by a conduit 26, with cooler 27 therein, to the inlet of the stage 3 compressor 21, and the outlet of stage 3 compressor in turn is connected by conduit 28 with cooler 29 therein to the inlet of the stage 4 compressor 21. The outlet 30 from the stage 4 compressor delivers the compressed or repressurized gas to the transmission line at a much higher pressure than the pressure at which it was received at the inlet of the first stage compressor 21.

The cooling fluid, such as water, is supplied under pressure through a pipe 31 that within the enclosure serves as a supply header with a branch 32 leading to the inlet 33 of each cooler. The outlet 34 from each cooler is connected by pipe 35 to a common header (not shown) or individually to discharge as waste.

To facilitate the smooth swirling flow of gases in the swirl chamber 4, an annular arcuate baffle 36 is arranged at each end of the swirl chamber 4 with its convex face directing toward the outside cylindrical wall of the chamber, as can be seen in FIGURES 1 and 2, so that gases are properly directed.

Figure 4:
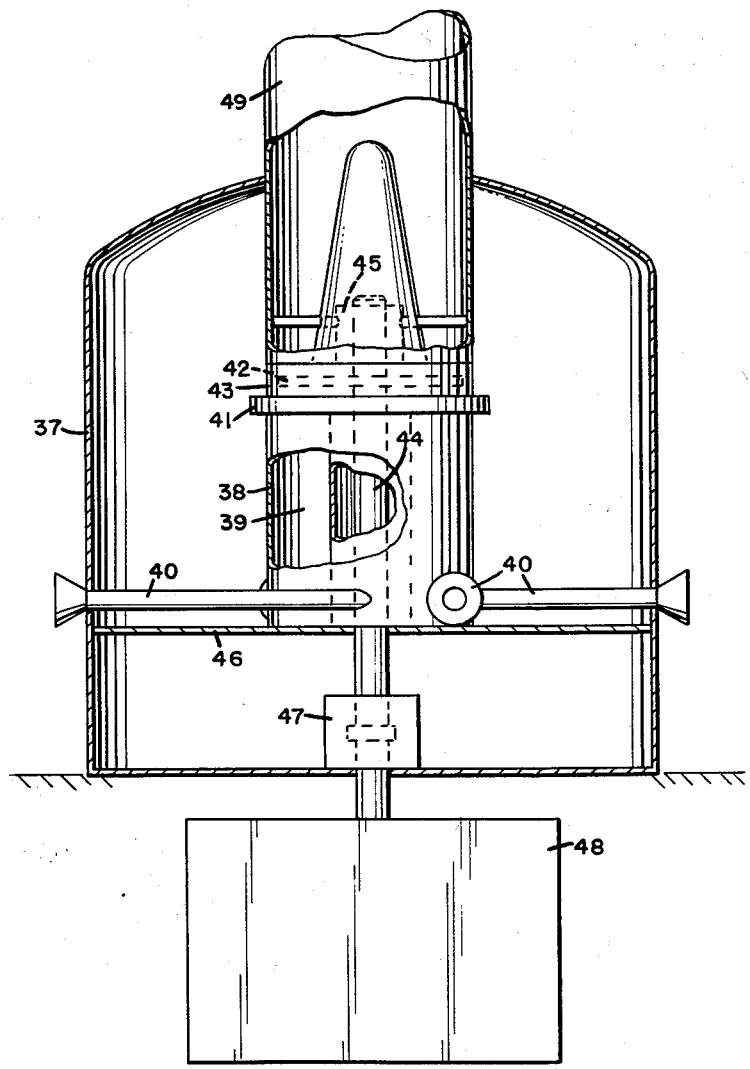
FIG. 4 is a schematic view in side elevation of another use of the invention, such as to operate a load in the nature of a compressor or an electric generator.

In the example of the invention illustrated schematically in FIG. 4, covering a vertical plant arrangement, within a building 37 is arranged an upright housing 38 with an annular, cylindrical swirl chamber 39 therein and corresponding functionally to the swirl chamber 4 of FIGS. 1 to 3. A plurality of gas generators 40 corresponding to generators 5 of FIGS. 1 to 3 are arranged around the swirl chamber and open into one end portion of it in the same directions that are generally tangential to it. The upper end of the swirl chamber 39 is closed by a nozzle ring 41 that has a plurality of nozzle passages (not shown) through it from face to face in the area covering the upper end of the annular swirl chamber and which direct streams of gas received under pressure from the swirl chamber against the vanes or impellor elements of a turbine drive wheel 42 within a housing 43, but not specifically shown. These nozzle rings and turbine wheels are typical of many in common use and hence are only schematically illustrated. Any suitable nozzle ring and turbine wheel may be used.

The turbine wheel is fixed on a shaft 44 which has a bearing 45 just above the turbine wheel, and depends through the space enclosed by the inner side wall defining the swirl chamber 39, and below a base horizontal wall 46 of the building 37, where it is rotatably supported by a radial and thrust bearing 47 and then is drivingly coupled to a suitable utilization load 48, such as, for example, a compressor of any kind or an electric generator. An exhaust stack 49 rises from the turbine housing 43 and discharges the gases that pass and drive the turbine wheel 42. Within this stack 49 is a somewhat upwardly tapering wall surrounding and shielding the upper bearing 45 of the turbine shaft 44 and which functions as an exhaust diffuser.

In FIGS. 1–3 the invention is applied to the pressurization of a gas, such as a fuel gas, in transit, or for return to petroleum wells, after its separation from petroleum, to force more petroleum to the surface of the ground, and it is supplied to the first compressor 21 (FIG. 3) by inlet 22, and is delivered from the 4th stage compressor 21 by outlet 30. This gas as it passes from stage to stage is cooled by coolers 25. The compressors are driven by individual drive turbines 15 which are supplied with operating gas under pressure from the upper end of the swirl chamber 4. The swirl chamber receives the operating gas from one or more of the gas generators 5. Any one or more of these gas generators can be shut down or started without affecting the operation of the others and since they all deliver the gas under pressure into one end of the swirl chamber in corresponding directions generally tangential of that chamber, they will swirl in that chamber and progress towards the opposite end for delivery to the drive turbines 15 without loss of velocity due to turbulence in the chamber 4.

The plurality of drive turbines can operate utilization devices other than gas compressors, and an example of such other use is illustrated in FIG. 4. In this embodiment of the invention, the plurality of gas generators 40, which correspond to the gas generators 5 of FIGS. 1–3, deliver operating gas under pressure to the lower end of the annular cylindrical swirl chamber 39, tangentially thereof and all in corresponding tangential directions. At the top of the swirl chamber is a turbine wheel 42 supplied with a plurality of jets of the operating gases from the swirl chamber. This turbine wheel is fixed on the upright, rotatably mounted shaft 44 that extends down through the center space of the swirl chamber and operates any utilization load 48 such as a compressor or electric generator or any other load device. The exhaust gases from the turbine pass upward through the exhaust diffuser. The turbine wheel can, of course, be disposed at one end of the swirl chamber, as in FIGS. 1–3, and any desired number of such turbine wheels can be operated by gases from the upper end of the swirl chamber. The swirling of the gas in the plenum chamber by the tangential inlets and outlets is improved by the use of the inner cylindrical wall 3 which inhibits any tendency toward turbulence in the swirling gases.

It will be understood that various other changes in the details, and arrangements of parts, which have been herein described and illustrated in order to explain the nature of the invenion, may be made by those skilled in the art within the principle and scope of the invention, as expressed in the appended claims.

I claim:

1. A gas pumping device which comprises:
   (a) a housing having therein a cylindrical swirl chamber, closed at its ends, and having adjacent one end thereof, and arranged at intervals peripherally around it, a plurality of inlet ports entering the chamber in directions approximately tangentially thereof in the same peripheral directions, also having adjacent its opposite end, a plurality of similarly arranged outlet ports leaving said chamber in directions approximately tangentially thereof in the same peripheral directions,
   (b) a plurality of gas generators each connected to one of said inlet ports for supplying thereto a gas under pressure, (c) a plurality of gas compressors arranged around and exteriorly of said chamber, (d) turbine means connected to each of said outlet ports and driven by gas under pressure from said chamber, and each such turbine means being drivingly connected to and operating an individual one of said gas compressors, (e) conduit connecting means between said compressors for passing a gas to be compressed, in succession through said compressors and compressing such gas in successive stages in successive compressors, (f) means for cooling the gas being compressed by said compressors, (g) means connected to the inlet of the first of the compressors in such succession by which a gas to be compressed can be delivered progressively thereto, and (h) means connected to the outlet of the last of the compressors in such succession, by which the gas compressed in successive stages in such compressors may be received and delivered under pressure for utilization.

2. The device according to claim 1, and wall means in said swirl chamber, extending endwise therein and approximately concentric with and smaller than the peripheral wall of said chamber for confining the gases in said chamber to a limited annular space along the wall of the chamber between the inlet and outlet ports.

3. The device according to claim 1, and an exhaust silencer into which each turbine means discharges.

4. The device according to claim 1, wherein:
(a) said chamber has its axis upright, and said compressors and turbine means are at a level above said inlet ports to said chamber, and
(b) said compressors are arranged in spaced apart relation to one another horizontally around said chamber.

5. The device according to claim 1, wherein
(a) each gas generator operates individually, and
(b) means for individually cutting off flow communication between each gas generator means and the related inlet port to which it is connected, when any gas generator means is to be inactivated and thereby preventing escape of gas under pressure from said chamber through an inactivated gas generator.

6. A gas pumping device which comprises
(a) a cylindrical casing closed at its ends and having a swirl chamber therein with a plurality of inlet ports opening into said chamber at intervals around it in directions tangentially thereof in the same peripheral directions and adjacent one end thereof and a plurality of outlet ports adjacent the opposite end thereof and arranged at intervals peripherally about it, and opening outwardly from said chamber in directions tangentially thereof in the same peripheral directions as said inlet ports,
(b) a drive turbine connected to each outlet port,
(c) a gas compressor operated by each turbine,
(d) gas generator means connected to each inlet port for supplying a burning mixture of gas and air under high velocity and pressure to said one end of said chamber for driving said turbines,
(e) means connecting together and in series with one another said compressors and having cooling means in the connection between each pair of said compressors in the series,
(f) means for supplying gas to be compressed to the inlet of the compressor at one end of the series, and
(g) conduit means connected to the outlet of the compressor at the other end of the series for receiving and transmitting the gas progressively compressed in the compressors in series.

7. A gas pressurizing station which comprises (a) a housing having a cylindrical swirl chamber, and having adjacent one end a plurality of inlet ports arranged peripherally about said chamber and opening into it in directions generally tangentially thereof in the same peripheral directions, and also having adjacent to its other end a plurality of outlet ports arranged at intervals peripherally about it and opening outwardly in directions generally tangentially thereof in the same peripheral directions as said inlet ports,
(b) means for supplying a gas under pressure to each of said inlet ports of said chamber,
(c) a turbine connected to each of said outlet ports and driven by gas under pressure from said chamber,
(d) a gas compressor operated by each turbine, and
(e) means connecting said compressors in series, with an inlet connection at one end of the series to receive the gas to be pressurized, and an outlet connection at the other end of the series for delivering the pressurized gas for utilization.

8. The station according to claim 7, and means for cooling the gas being pressurized by said compressors, during its passage through said series of compressors.

9. The station according to claim 7, and means within said housing for confining the gas passing through said chamber between said inlet and outlet ports to an annular space along the larger diameter wall of the chamber.

10. A gas pressurizing station which comprises
(a) a housing having a cylindrical swirl chamber, and having adjacent one end a plurality of inlet ports arranged peripherally about said chamber and opening into it in directions generally tangentially thereof, in the same peripheral directions, and also having adjacent to its other end a plurality of outlet ports arranged at intervals peripherally about it and opening outwardly in directions generally tangentially thereof in the same peripheral directions as said inlet ports,
(b) means for supplying a gas under pressure to each of said inlet ports of said chamber,
(c) a turbine connected to each of said outlet ports and driven by gas under pressure from said chamber,
(d) a gas compressor operated by each turbine,
(e) means connecting said compressors in series, with an inlet connection at one end of the series to receive the gas to be pressurized, and an outlet connection at the other end of the series for delivering the pressurized gas for utilization,
(f) means for cooling the gas being pressurized by said compressors, during its passage through said series of compressors, and
(g) means within said housing for confining the gas passing through said chamber between said inlet and outlet ports to an annular space along the larger diameter wall of the chamber.

11. A gas generator operated load device in which the high velocity of a high pressure driving gas from gas generating means to turbine means driven thereby undergoes minimum loss in transit to the turbine means, which comprises
(a) a housing having a cylindrical swirl chamber,
(b) a plurality of gas generators connected to one portion of said chamber for delivering gas under high pressure and high velocity into said one portion of said swirl chamber in directions generally tangentially thereof in the same peripheral directions and at intervals around the chamber circumference,
(c) a plurality of gas driven turbines connected to said swirl chamber at a portion thereof spaced well in a direction axially of the chamber, from said one portion, and receiving gas from said chamber all in the same tangential directions thereof as said first mentioned tangential directions, and
(d) utilization load means operated by each of said turbines, (e) whereby inactivation of a part only of the said gas generators in supplying operating gas to said swirl chamber will not greatly decrease the operating efficiency of the device with the gas generators still in operation.

12. The device according to claim 11, wherein said utilizations load means includes a gas compressor operated by each turbine and all such compressors connected in series to effect multiple stage compression.

13. The device according to claim 11, wherein said utilizations load means includes a gas compressor operated by each turbine and all such compressors connected in series to effect multiple stage compression, and means for cooling any gas compressed in different stage compressions at least once in said series.

14. In a power device of the type in which a plurality of drive turbines are operated by gas under pressure that passes through a common plenum chamber from gas generating means to said drive turbines, that improvement in said plenum chamber which comprises
(a) a cylindrically shaped, closed housing providing the plenum chamber with a plurality of inlet ports located adjacent one end thereof and which open into said chamber in directions generally tangentially of the cylindrical wall and all in the same directions peripherally of the chamber, and a plurality of outlet ports adjacent the opposite end thereof, opening outwardly in directions generally tangentially of the chamber and in the same directions peripherally of the chamber, said inlet ports having valve means connected therewith for closing off any one of said ports,
(b) whereby when said gas generating means delivers one or more streams of gas under pressure through said inlet ports into said plenum chamber and it is delivered by said outlet ports to said drive turbines, the gas in said chamber will swirl as it progresses from the inlet ports to the outlet ports, with minimum loss of velocity and head, and whereby any one of said ports may be closed without disturbing uniformity of gas supply to said turbine units.

15. A gas operated turbine installation, comprising,
(a) a housing having a cylindrical swirl chamber,
(b) a plurality of gas passages each having an inlet opening tangentially in the same peripheral direction into said swirl chamber adjacent one end thereof,
(c) at least one of said inlet passages having valve means connected therewith for closing off said passage,
(d) a gas generator unit connected to each of said passages for delivering gas under pressure thereto,
(e) a plurality of outlet ports adjacent the other end of said swirl chamber and arranged tangentially thereto, said outlet ports being in the same peripheral direction as said inlet ports, said outlet ports being substantially spaced axially from said inlet ports,
(f) a gas turbine connected to each of said outlet ports,
(g) utilization load means operated by each of said turbines,
(h) whereby an inlet passage having a valve means associated therewith may be blocked by closing said valve means and the corresponding gas generators inactivated, while the remaining units will continue functioning and will supply gas under desired pressure and velocity conditions to all of said gas turbine units.

16. A gas operated turbine installation as set forth in claim 15 wherein said swirl chamber is disposed vertically, with said gas turbine units and said gas generators disposed circularly therearound.

References Cited by the Examiner
UNITED STATES PATENTS 2,923,526　2/60　Street _____ 253—78
3,001,692　9/61　Schierl _____ 230—129

LAURENCE V. EFNER, *Primary Examiner.*